Figure 1:
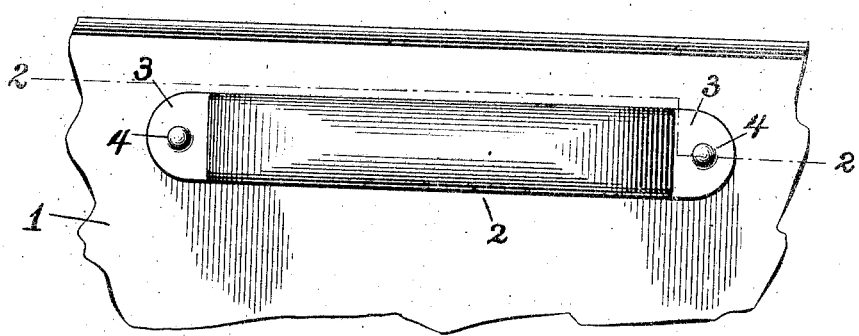

G. W. KNAPP.
METHOD OF ELECTRICALLY WELDING LAPPED SHEET METAL.
APPLICATION FILED JAN. 9, 1909.

993,307.

Patented May 23, 1911.

Witnesses
Edwin L. Bradford
D. Ferdinand Vogt

Inventor
George W. Knapp
By Mann & Co.
Attorneys

UNITED STATES PATENT OFFICE.

GEORGE W. KNAPP, OF BALTIMORE, MARYLAND, ASSIGNOR TO NATIONAL ENAMELING AND STAMPING COMPANY, OF BALTIMORE, MARYLAND, A CORPORATION OF NEW JERSEY.

METHOD OF ELECTRICALLY WELDING LAPPED SHEET METAL.

993,307.  Specification of Letters Patent.  Patented May 23, 1911.

Application filed January 9, 1909. Serial No. 471,477.

*To all whom it may concern:*

Be it known that I, GEORGE W. KNAPP, a citizen of the United States, residing at Baltimore, in the State of Maryland, have invented certain new and useful Improvements in Methods of Electrically Welding Lapped Sheet Metal, of which the following is a specification.

This invention relates to an improved method for attaching handles, ears, knobs and the like to sheet metal vessels by electric welding. The electric welding here referred to is that known as autogenous, where the direct union of the metal of the parts is effected without solder.

In the operation of electrically-welding two sheet-metal parts, such as a pan or cup and its handle, or a bucket and its ears, where the vessel or other article is placed or guided by the hand of an operator, it often results that the parts welded have an exterior rough spot, bur or scar that is unsightly and objectionable when the article has been finished. The production of this rough spot is due to the fact that the operator did not succeed in placing the article so that the electrode made contact in the exact spot desired.

The object of this invention is to provide an improved method for electrically welding a sheet-metal handle, ear, or other article to a vessel.

Figure 2:
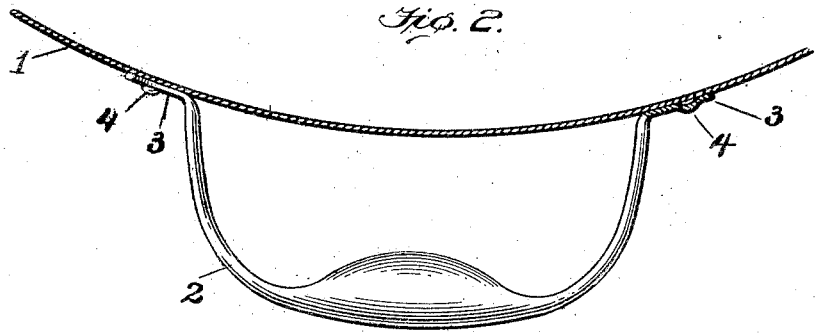

The invention is illustrated in the drawing in which,

Figure 1 is a side view of a portion of a sheet-metal pan having an electrically-welded handle attached by this method. Fig. 2 shows a horizontal section of the pan on the line 2—2 of Fig. 1, showing the cavity.

The invention is applicable to any shape of sheet-metal vessel, and to any kind of sheet-metal handle, ear, knob or other part.

In the drawing the numeral, 1, designates the vessel; the handle, 2, must have one or more portions, 3, where the welding is to be effected, of such shape as to closely fit in contact with the wall or other part of the vessel except where the cavity occurs. The cavity is formed in the said part, 3, directly under the exterior projection or raised spud, 4. In this welding operation no rivets are required and there is no necessity for holes, or for projections in one plate which coöperate with cavities in the other plate that is to be welded.

In order to weld the two parts—namely the vessel and the handle or ear, they are placed in position with the cavity of the handle facing the surface of the vessel. The stationary electrode is then brought in contact with the inner surface of the vessel, and the movable electrode which has a bore or counter-sunk part is then brought in contact with the portion, 3, of the handle around the spud, 4, and pressure is then applied around the base of said projection or spud, 4, which presses the surrounding margin of the cavity in close contact with the surface of the vessel; the electric current then passes through portion, 3, but not through the spud or cavity, and effects the welding, the result is a neat union without any objectionable bur or scar, and without disturbing the cavity or spud. When finished the spud, 4, in appearance resembles an ordinary rivet.

From the foregoing explanation it will be understood that the two sheet-metal parts are lapped or laid close together and one of the lapped parts has on its outer surface a bump or spud formed by punching or stretching the metal which produces a gap or cavity on the inner surface between the two lapped parts. The formation of this bump or spud has two effects, in that it prevents welding at the gap or cavity of separation and provides that the union of the two metals shall take place around the base of the imperforate bump or spud forming an annular-shaped spot-weld and leaving an unwelded closed cavity or space within the said annular-shaped welded portion thus insuring a weld of greater area than would often result if the said imperforate bump were omitted. Moreover the imperforate bump or spud on the outer side of one of the lapped plates is not melted down but serves to definitely locate and form a guide for the electrode, which in small metal articles must be accurately placed in position to produce attractive results.

Having thus described my invention what I claim and desire to secure by Letters Patent is,—

The method of electrically welding lapped sheet-metal parts consisting in forming on the exterior surface of one of the said lapped parts an outward-pressed imperforate bump or spud thereby producing a cavity on the inner surface of said part, placing the cavity side of said part against the imperforate surface of the other sheet-metal part thereby forming a closed cavity, applying pressure to press the annular metal base surrounding the said closed cavity into intimate contact with the surface of the other metal part, and passing an electric heating current through the said annular base of the cavity and fusing the two metal parts together around the closed cavity and leaving the said cavity unwelded.

In testimony whereof I affix my signature in presence of two witnesses.

GEORGE W. KNAPP.

Witnesses:
  GEO. W. KNAPP, Jr.,
  LOUIS C. KLERLEIN.

---

Copies of this patent may be obtained for five cents each, by addressing the "Commissioner of Patents Washington, D. C."